(12) United States Patent
Freeman et al.

(10) Patent No.: US 11,561,418 B2
(45) Date of Patent: Jan. 24, 2023

(54) TRANSPARENT PROJECTION SCREEN

(71) Applicant: Innovega Inc., Bellevue, WA (US)

(72) Inventors: Mark Freeman, Bellevue, WA (US);
Jay Marsh, Bellevue, WA (US);
Jerome Legerton, Bellevue, WA (US)

(73) Assignee: INNOVEGA INC., Bellevue, WA (US)

( * ) Notice: Subject to any disclaimer, the term of this patent is extended or adjusted under 35 U.S.C. 154(b) by 7 days.

(21) Appl. No.: 17/372,151

(22) Filed: Jul. 9, 2021

(65) Prior Publication Data

US 2022/0066241 A1 Mar. 3, 2022

Related U.S. Application Data

(63) Continuation of application No. 15/498,104, filed on Apr. 26, 2017, now Pat. No. 11,231,602.

(60) Provisional application No. 62/327,834, filed on Apr. 26, 2016.

(51) Int. Cl.
| | | |
|---|---|---|
| *G02B 5/02* | (2006.01) | |
| *G02C 7/12* | (2006.01) | |
| *G02C 7/04* | (2006.01) | |
| *G02B 27/48* | (2006.01) | |
| *G03B 21/62* | (2014.01) | |
| *G02B 5/30* | (2006.01) | |

(52) U.S. Cl.
CPC .............. *G02C 7/12* (2013.01); *G02B 5/0221* (2013.01); *G02B 5/0236* (2013.01); *G02B 5/0284* (2013.01); *G02B 27/48* (2013.01); *G02C 7/042* (2013.01); *G03B 21/62* (2013.01); *G02B 5/3058* (2013.01); *G02C 7/044* (2013.01)

(58) Field of Classification Search
CPC .... G02B 5/021; G02B 5/0221; G02B 5/0236; G02B 5/0284; G03B 21/606; G03B 21/62
USPC ................ 359/449, 454, 478, 599, 615, 883
See application file for complete search history.

(56) References Cited

U.S. PATENT DOCUMENTS

| | | | | |
|---|---|---|---|---|
| 2,558,848 A * | 7/1951 | Harrison | ................ | A45D 42/00 359/603 |
| 5,073,009 A * | 12/1991 | Tovi | ....................... | G02C 7/021 351/159.63 |
| 5,464,710 A * | 11/1995 | Yang | ........................ | G03H 1/02 204/192.27 |
| 6,231,183 B1 * | 5/2001 | Dillon | ...................... | G02C 7/12 351/44 |
| 9,791,697 B2 * | 10/2017 | Yamaguchi | ........ | G02B 27/0101 |
| 9,952,494 B2 * | 4/2018 | Tao | ........................... | G02B 5/02 |
| 11,231,602 B2 * | 1/2022 | Freeman | ............... | G02B 5/0236 |
| 2005/0052745 A1 * | 3/2005 | Lee | ...................... | G02B 5/1861 359/567 |
| 2009/0067057 A1 * | 3/2009 | Sprague | ............ | G02B 27/0101 359/630 |
| 2009/0086154 A1 * | 4/2009 | Dillon | .................... | G02C 7/021 351/44 |

(Continued)

*Primary Examiner* — Ricky D Shafer

(74) *Attorney, Agent, or Firm* — Viksnins Harris Padys Malen LLP

(57) ABSTRACT

According to some embodiments, a transparent screen includes a first transparent substrate having a first transparent substrate index of refraction and including a surface relief pattern, a partially reflective coating formed on the surface relief pattern, and a second transparent substrate bonded over the partially reflective coating with an optical adhesive having the first transparent substrate index of refraction.

2 Claims, 10 Drawing Sheets

(56) References Cited

U.S. PATENT DOCUMENTS

2014/0104690 A1* 4/2014 Sandre-Chardonnal ................... B32B 17/10706
156/212
2016/0011342 A1* 1/2016 Griffin .................. G03B 21/62
359/599

* cited by examiner

Example scattering profiles - circular, elliptical, angled circular
scattering profile elliptical
scattering profile narrow,
angled, circular
scattering profile medium,
angled, circular
scattering profile

TRANSPARENT PROJECTION SCREEN

CROSS-REFERENCE TO RELATED APPLICATIONS

This applications is a continuation of U.S. patent application Ser. No. 15/498,104, filed 26 Apr. 2017, which claims priority under 35 U.S.C. 119(e) to U.S. Provisional Patent Application No. 62/327,834, filed 26 Apr. 2016. The entire content of the applications referenced above are hereby incorporated by reference herein.

FIELD

The present disclosure is directed to an apparatus that provides a transparent projection screen and methods of use and manufacture of the transparent projection screen.

BACKGROUND

There is a need for a transparent projection screen, that is, a screen on which information can be projected and viewed, but which also allows viewers to look through the screen as if it were a window to clearly see objects and the scene on the other side of the screen. Applications for this type of transparent screen include any situation where there is a need to overlay projected information onto the world seen through the screen. Typically, the projected information is intended to aid the viewer in interpreting or interacting with the world seen through the screen. Examples include head-up displays for drivers or pilots, and augmented reality displays—either headworn or fixed—providing information to the viewer related to or adding to the real world scene she is viewing.

This is difficult to accomplish because a projection screen fundamentally is a scattering surface, such that light incident onto it is scattered over a range of angles so that the projected light pattern on the screen surface can be viewed. FIG. 1 shows a front projection screen 130 and onto which light from an image source 110 in the projector is imaged by the projector lens 120 to form focused ray bundles 140 incident onto the screen 130. Light from the focused ray bundles 140 is scattered by the screen to create reflected light at each pixel over a range of angles 150 allowing the projected image to be viewed by viewers on the same side of the screen as the projector. The very nature of a scattering surface is opposite to that of a transparent medium, since transparency implies the absence of scattering.

Some existing transparent projection screen technologies are a compromise where minimal scattering is introduced to provide the projection screen function (which is by consequence very dim), but there is observable blur in the transmitted view. Another approach uses a holographic element to scatter light that is incident from a narrow range of angles, while light at other angles is unaffected. In this case, the projected light is restricted to the narrow range of angles for which there is holographic scattering.

Yet another approach uses a pixel-sized beam expander or numerical aperture expander as the fundamental scattering element. This element expands the beam in a deterministic (as opposed to random) manner. This fundamental scattering element is replicated to cover the screen area. This approach may provide a good scattering surface that works well with laser-based projection systems to minimize the presence of laser speckle in the display. However, it introduces a fundamental limitation to the display resolution in that a display pixel must be at least as big as the underlying shape element (typically a microlens) that is repeated at a given spacing (typically a microlens array) to create the scattering profile of the scattering surface.

Further, creating a transparent screen that has an off-normal center of scattering symmetry for normally incident light using a given fundamental scattering element replicated in an array requires difficult and expensive grayscale lithography and sophisticated processing to achieve the desired asymmetry of the individual elements and the smooth optical surface quality.

To create a fully space variant scattering surface, where the light is scattered with off-normal scattering direction which also changes from location to location on the scattering surface requires very expensive and time consuming lithography to write the grayscale mask pattern because each of the underlying fundamental elements has a unique profile and therefore step and repeat lithographic techniques cannot be used to simplify the writing process. This means the lithography must individually address a massive number of points, which may be prohibitive if the size of the desired screen is large.

Thus, the existing designs for transparent screens have a number of limitations that keep them from being widely used. Either they don't offer the needed performance by degrading the projected image or the see-through view, or they place inflexible design constraints on system designers, or they are cost- or time-prohibitive due to the complexity of creating the desired scattering profile. For these and other reasons there is a need for the present disclosure.

SUMMARY

In some embodiments, a transparent screen includes a first transparent substrate having a first transparent substrate index of refraction and including a surface relief pattern, a partially reflective coating formed on the surface relief pattern, and a second transparent substrate bonded over the partially reflective coating with an optical adhesive having the first transparent substrate index of refraction. In some embodiments, a method includes applying a partially reflective coating to a surface relief pattern of a first transparent substrate having a first transparent substrate index of refraction, to generate a desired scattering profile, and bonding a second transparent substrate to the partially reflective coating with an optical adhesive having a cured index of refraction substantially equal to the first transparent substrate index of refraction.

DESCRIPTION

Figure 1:
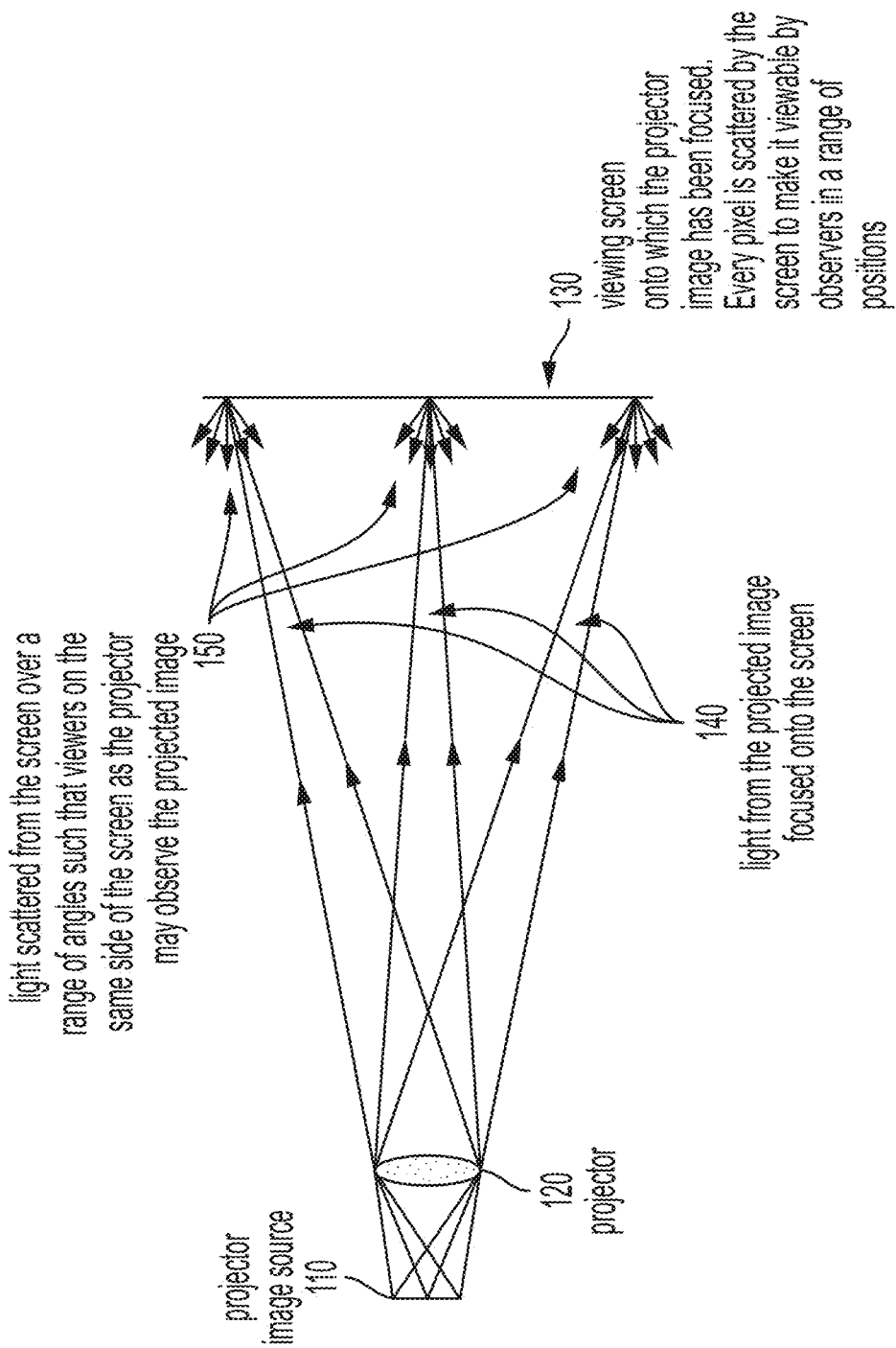
FIG. 1 shows an illustration of a front projection screen.
Figure 2A:
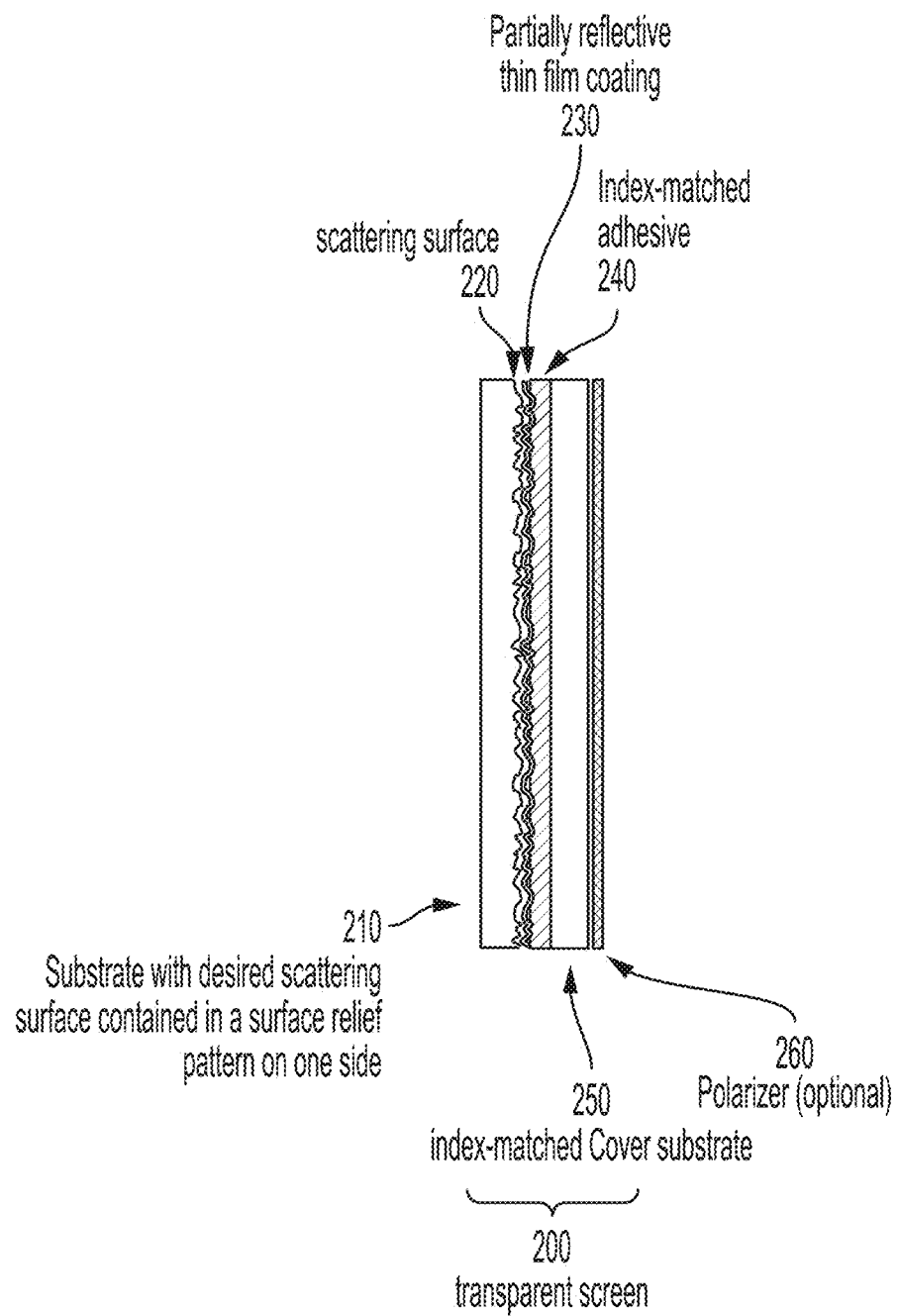
FIG. 2A shows an illustration of some embodiments of a transparent screen in accordance with some embodiments of the present disclosure.

FIG. 2A shows an illustration of a substrate 210 having the desired scattering properties contained in a surface relief pattern 220, such as a scattering surface, located on one side of the substrate 210. In some embodiments the substrate 210 is made from a transparent material such as glass or transparent plastic (acrylic, polycarbonate, zeonex, to name a few) and has no scattering properties other than a scattering surface relief pattern 220. This surface relief pattern 220 has a randomly varying profile with height and transverse variations much smaller than the minimum pixel size. By a randomly varying profile, it is meant that the spatial frequency spectrum of the scattering surface profile is substantially flat over a range of spatial frequencies in a frequency range higher than the inverse of the minimum pixel size to be displayed and it does not show any significant periodic structure. This type of scattering or diffusing element is available, for example, from suppliers such as Luminit, Inc. of Torrance, Calif. and Brightview Technologies Corporation of Durham, N.C.

The random scattering surface is characterized by a spatial frequency spectrum of the scattering surface profile that is substantially flat over a range of spatial frequencies in a frequency range which extends to variations on the order of a wavelength of visible light. Also, the random scattering surface does not include any significant periodic structure. The random scattering surface is composed of a continuum of frequencies, all of approximately the same level. There are no spikes in the frequency spectrum which would indicate that a certain frequency (or frequencies) makes a more dominant contribution to the signal or the surface relief profile than other frequencies in the spectrum. In addition, "random scattering surface" is also used to differentiate embodiments of the disclosure from periodic beam expander technology for the surface profile.

The use of a random scattering surface is fundamental to two important properties of the disclosure. First, since the surface profile has a continuum of spatial frequencies extending to frequencies with variations on the order of a visible light wavelength, the resulting screen has no minimum pixel size limitation. Second, this type of random scattering surface can be produced using an optical recording method as shown in FIG. 6 to obtain space-varying scattering profiles that are difficult, if not impossible, to achieve using deterministic lithographic means. In some embodiments, the surface relief variations extend to sizes as small as substantially the order of a wavelength of visible light.

In some embodiments, during the fabrication of the substrate 210 a partially reflective thin-film coating 230 is applied to the surface relief pattern 220 using optical thin-film coating technologies, which may be vacuum deposition, evaporation, sputtering or any of the other thin-film deposition methods used in the industry. The coating may be either metallic or dielectric or a combination of the two. The thickness of the deposited layer or layers as well as the materials used is chosen (by design and experience) to produce partial reflectance over the visible spectrum such as 50% reflectance/50% transmittance/0% absorption or 20% reflectance/65% transmittance/15% absorption to give two examples from an unlimited number of possibilities. Typically, the coating response will be substantially flat (or uniform) over the visible spectrum although other spectral profiles are also within the scope of the disclosure. For example, the coating may be designed to selectively reflect (a higher reflectance value) at one or more narrow wavelength ranges while transmitting (a higher transmittance value) over the remainder of the visible spectrum. It is also within the scope of the disclosure that the transparent screen could be designed for use outside the visible spectrum range by choosing substrate materials and coatings for a non-visible optical spectrum range.

FIG. 2A also shows an index matched adhesive 240, in some embodiments, an optical adhesive, and an index matched cover substrate 250. The material used for the cover substrate 250 is chosen to have the same index of refraction as the substrate 210. In some embodiments, the two substrates are chosen to be the same material. The index matched adhesive 240, used to glue the two substrates together and to fill any gaps between surface relief pattern 220 of the scattering surface of the substrate 210 and the smooth surface of the cover substrate 250, is also chosen to the same or nearly the same index of refraction after curing as the two substrates. The index of refraction of the two substrates and the cured index-matched adhesive 240 should be chosen to match as nearly as possible, within a few percent, if possible. The criterion for sufficient index matching is that no observable reflections occur at the interface between the index-matched adhesive 240 and the index matched cover substrate 250.

Figure 3:
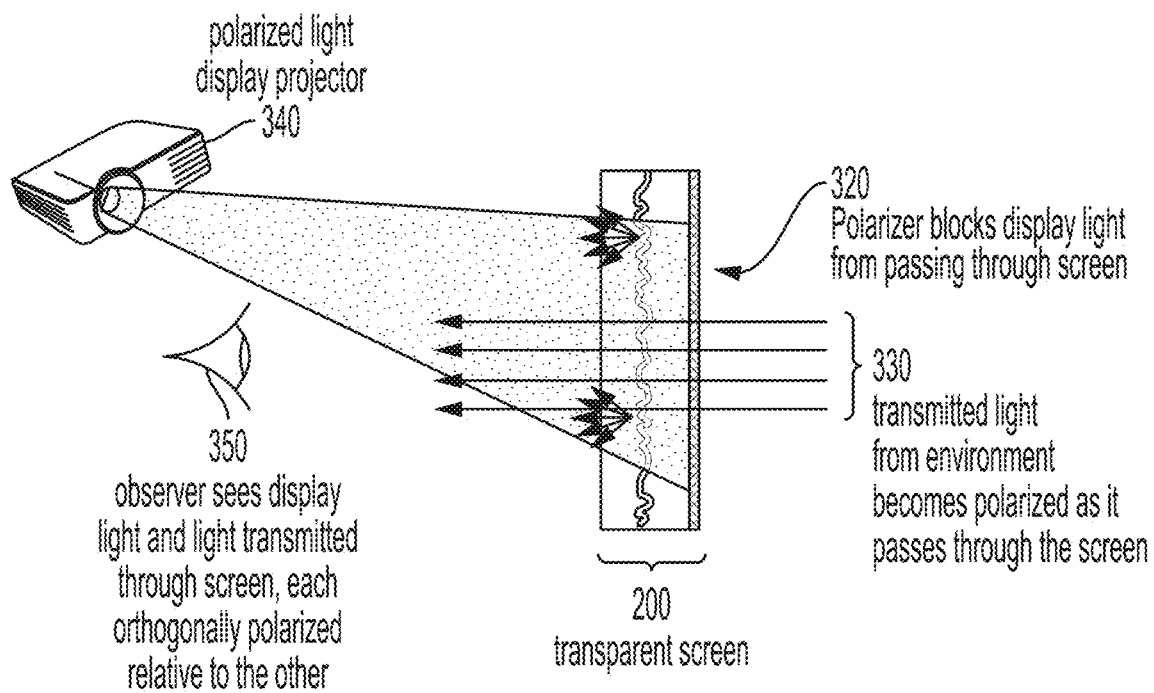
FIG. 3 shows an illustration of a polarizer included in a transparent screen assembly used to block display light from being transmitted, and to polarize the light transmitted from the environment in accordance with some embodiments of the present disclosure.

In some embodiments, a polarizer 260 is added to the assembly for improved performance in some applications. Inclusion of the polarizer 260 and the type of polarizer depends on the application. The polarizer 260 serves two functions. As seen in FIG. 3, if a polarized light projector 340 is used to project the display light onto the transparent screen 200 (for example LCD projectors are usually polarized), a properly oriented polarizer 320 included in the screen 200 can block the display light from being transmitted beyond the screen 200. At the same time, the polarizer 320 serves to polarize the light transmitted through the screen from the environment. In this embodiment, the display light and the transmitted light from the environment reach the eyes of the observer 350 with orthogonal polarizations. The observer is then able to switch between seeing the display light only, the transmitted environment light only, or both by viewing the transparent screen through a polarizer placed between the screen and the eye having the proper orientation.

Conversely, in some other applications of the transparent screen 200, it may not be important to block the transmission of the display light or to polarize the light from the environment, but instead the emphasis is on maximizing the transmittance of the screen. Since a polarizer cuts the transmittance of non-polarized light by approximately 50%, if maximizing the transmittance of the environmental light is the goal, then it is better to not include a polarizer in the transparent screen 200 assembly.

In some embodiments, the polarizer 320 is a linear polarizer. For example if the display projector 340 is linearly polarized, the functions described above are best accomplished with a linear polarizer added to the transparent screen assembly. In other embodiments, the observer may be moving or tilting her head while she is looking through a polarizer to select display or environment light for observing. The use of circular polarized light (at the projector, screen, and observer) will perform better under these conditions. In this case, a circular polarizer should be incorporated into the transparent screen 200 assembly.

There are a number of different varieties of polarizer that could be incorporated into the assembly. Linear polarizers include wire grid polarizer, dichroic (absorptive) polarizer, Glan type birefringent crystal polarizers, or liquid crystal polarizers. Circular polarizers are often constructed from a linear polarizer combined in sequence with a properly oriented quarter-wave retarder. Other types of circular polarizer such as liquid crystal also exist and can be used in this application. The polarizer can be included in the transparent screen 200 assembly either on an outside face as shown in FIG. 2A, or between the partial reflective coating 230 and the cover substrate 250.

Figure 2B:
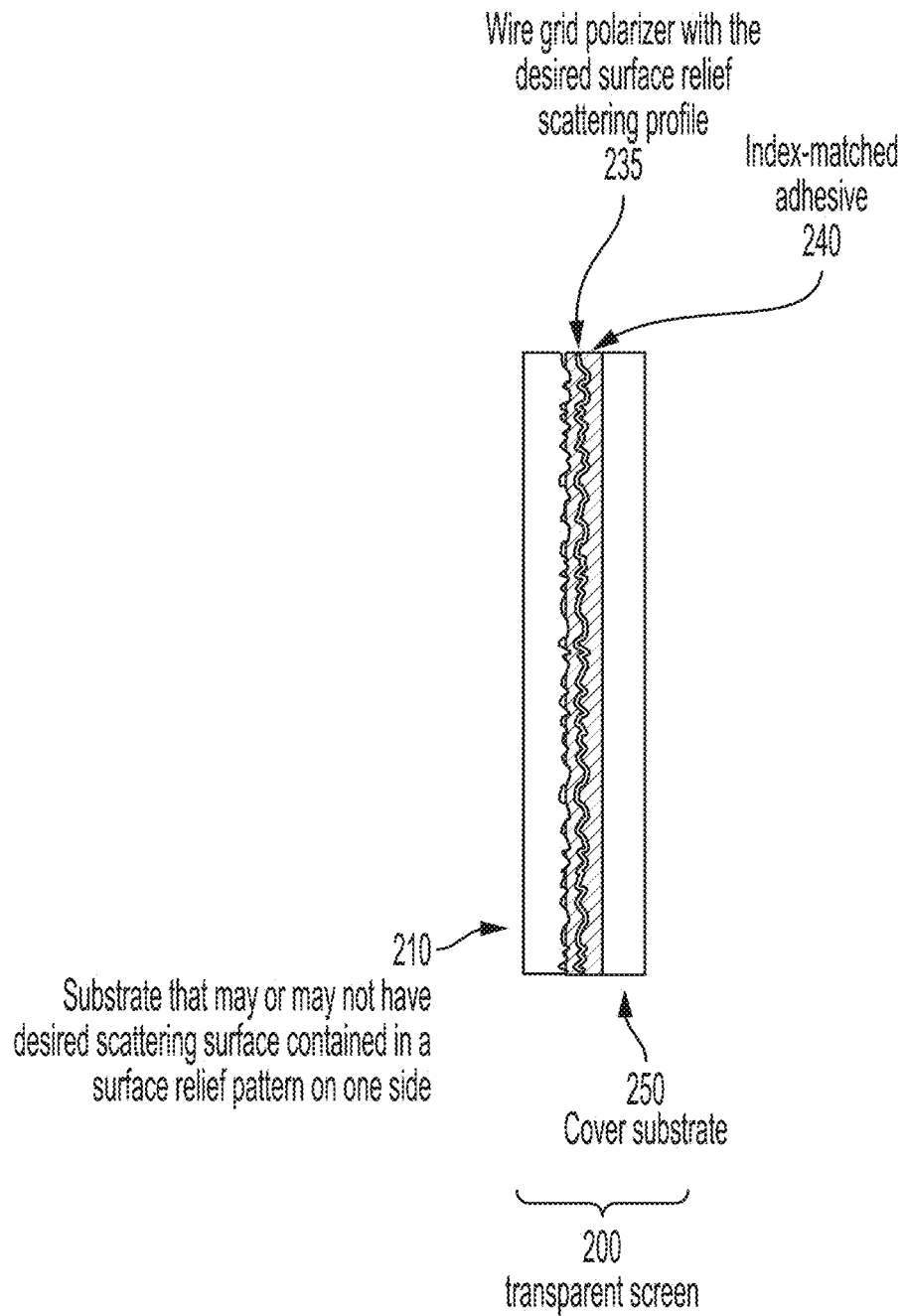
FIG. 2B shows an illustration of some embodiments of a transparent screen including a wire-grid polarizer in accordance with some embodiments of the present disclosure.

In another embodiment as shown in FIG. 2B, the polarizer 260 and the partial reflective coating 230 from FIG. 2A are combined into a single element, a wire-grid polarizer 235, by using a polarizing and partially reflective layer such as provided by a wire-grid polarizer. A wire grid polarizer is inherently partially reflecting in that it preferentially reflects one incident polarization (the polarization where the direction of the electric field is parallel to the direction of the wires making the wire grid) and preferentially transmits the orthogonal polarization (electric field perpendicular to the orientation of the wires making the wire grid). During fabrication of a wire grid polarizing layer, in some embodiments, the wire grid polarizing layer is deposited directly onto the surface relief pattern 220 on substrate 210, or the surface relief pattern 220 with the desired scattering profile is embossed into the wire grid polarizer 235 after it has been fabricated, and the embossed wire grid polarizer bonded between two substrates using a transparent optical adhesive preferably index-matched to at least substrate 210 and perhaps also to cover substrate 250 such that the optical adhesive fills the depth profile of the surface relief pattern from both sides of the embossed wire grid polarizer, and creates a uniform thickness layer between the two flat substrates. Since a single optical adhesive is used to fill the depth profile on both sides of the embossed wire grid polarizer, transmitted light sees a constant index of refraction as it passes through the layers containing the adhesive and embossed wire grid polarizer and, as a result, transmitted light is not scattered. The sub-wavelength discontinuity that is the thickness of the metal making the wire grid polarizer has the same thickness for all rays passing through the structure and therefore has no refractive effect on the transmitted light.

The structure of the transparent screen 200 and the relationship between the components will now be summarized. The transparent substrate 210 with the desired surface relief random scattering profile 220 is first coated with a partial reflecting thin film coating 230, and then adhered to a second transparent substrate 250 using an optical adhesive 240. The optional polarizer 260 can be adhered to an outer face of the transparent screen 200 assembly or to the inner face of the cover substrate 250. The rotational orientation of the polarizer 260 must be properly aligned with the expected polarization direction of the display light to be projected. The outer faces of the transparent screen 200 assembly are usually made parallel to each other (although not necessarily planar) so that light transmitted through the structure is not refracted and users see an undistorted view of the world through the transparent screen 200 just like looking through a window. In some embodiments, where the transparent screen 200 is used as lenses in a pair of glasses designed for augmented reality, the outer faces may be made intentionally non-parallel in order to incorporate a user's optical prescription into the augmented reality glasses.

By carefully matching the index of refraction of the first substrate 210 with the index of refraction of the cured index matched adhesive 240 and with the index of refraction of the cover substrate 250, light transmitted through the assembly experiences no change in the index of refraction and therefore no bending of the light ray occurs. In particular, since the surface relief scattering profile is filled with index-matched adhesive 240, all refractive properties of the surface relief scattering profile are effectively nulled. Light rays travelling through the partial reflective coating 230 are not deviated in position or angle because of the uniform index of refraction on both sides of the coating 230 and because of the negligible thickness of the coating 230. Light that is reflected by the partially reflective coating 230 experiences the depth variations of the scattering surface relief pattern since the coating follows the original surface relief. Therefore, reflected light is scattered at the partial reflective coating 230 and the structure manifests the properties of a front projection screen.

Figure 4:
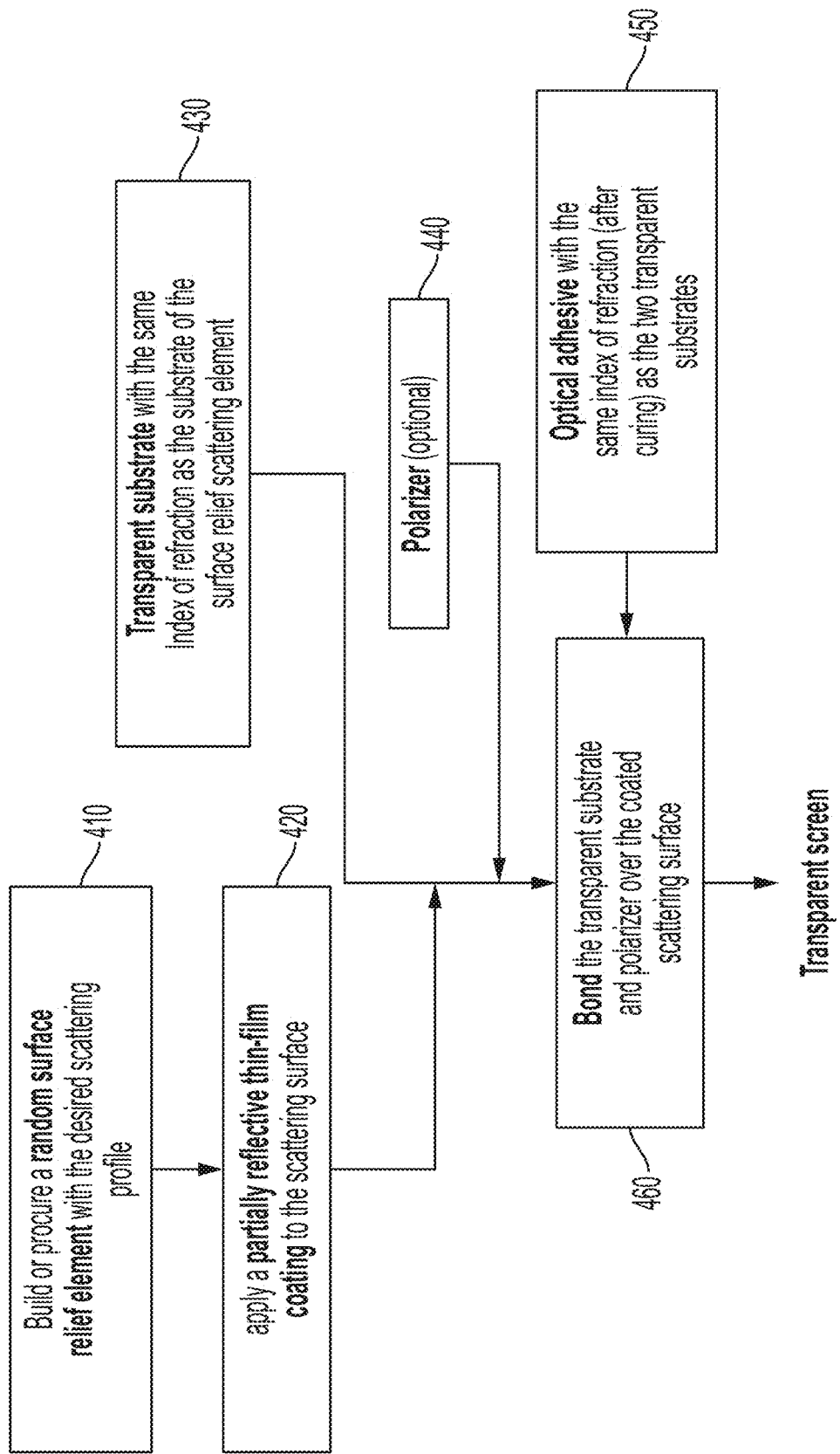
FIG. 4 shows an illustration of a flow diagram for the fabrication of a transparent screen in accordance with some embodiments of the present disclosure.
Figure 5A:
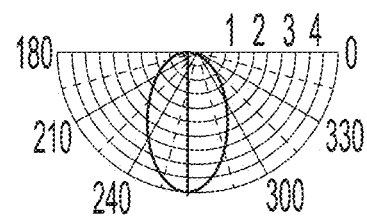
FIG. 5A shows an illustration of an exemplary circular scattering profile in accordance with some embodiments of the present disclosure.
Figure 5A:
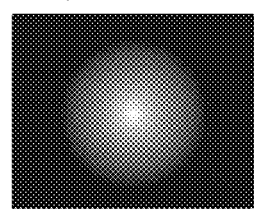
Figure 5B:
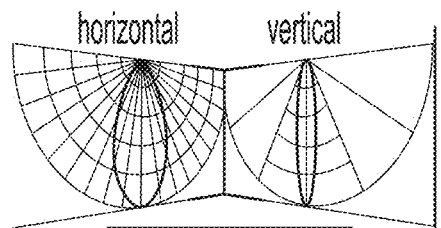
FIG. 5B shows an illustration of an exemplary elliptical scattering profile in accordance with some embodiments of the present disclosure.
Figure 5B:
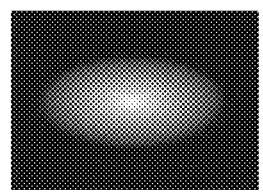
Figure 5C:
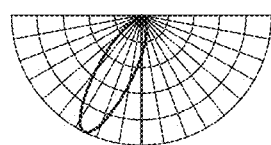
FIG. 5C shows an illustration of an exemplary narrow angled circular scattering profile in accordance with some embodiments of the present disclosure.
Figure 5C:
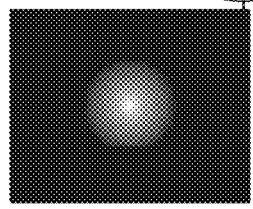
Figure 5D:
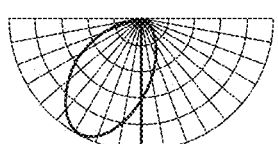
FIG. 5D shows an illustration of an exemplary medium angled circular scattering profile in accordance with some embodiments of the present disclosure.
Figure 5D:
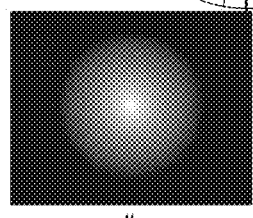

The process steps, for some embodiments, to construct the transparent screen of the disclosure are shown in FIG. 4. The first step in the process is to build or procure a random surface relief element with the desired scattering profile 410. Examples of scattering profiles are shown in FIGS. 5A-D. The most basic scattering profile is shown in FIG. 5A, that is isotropic scattering resulting in an on-axis circular scattering profile. Many diffusers, including ground glass, 3M Magic™ scotch tape, opal glass, as well as some holographic diffusers have this scattering profile. An elliptical scattering profile is shown in FIG. 5B. FIGS. 5C and 5D show off-axis, angled scattering profiles. These scattering profiles are available commercially in the desired surface relief scattering element format from suppliers such as Luminit, Inc. of Torrence, Calif. and Brightview Technologies Corporation of Durham, N.C.

Figure 6A:
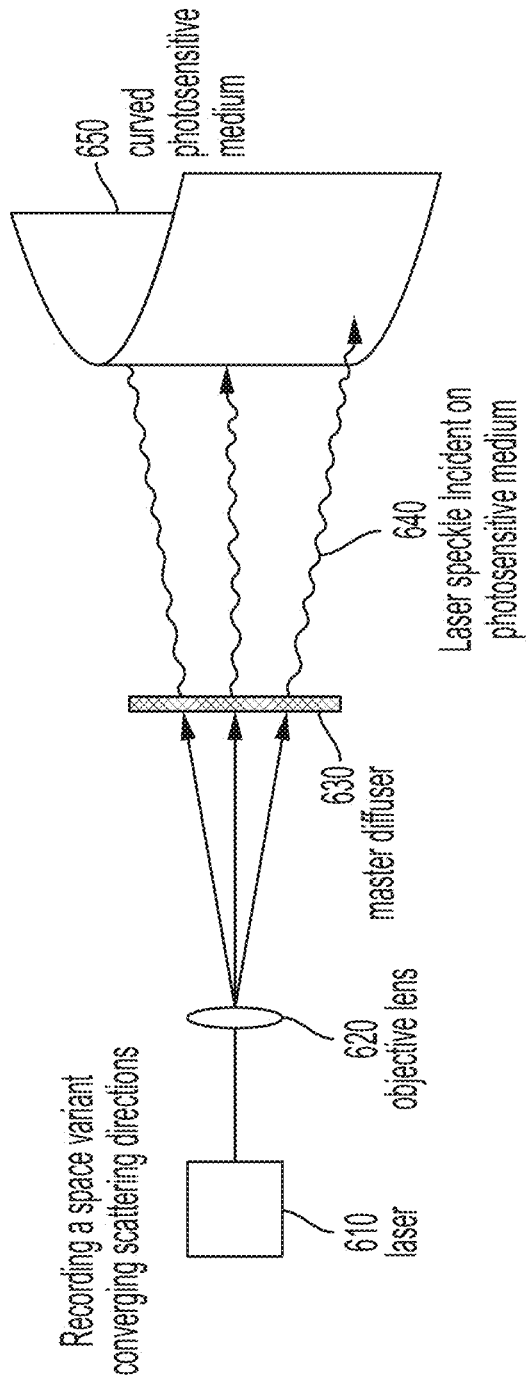
FIG. 6A shows an illustration of a system for recording a space variant scattering surface relief pattern with converging scattering directions in accordance with some embodiments of the present disclosure.
Figure 6B:
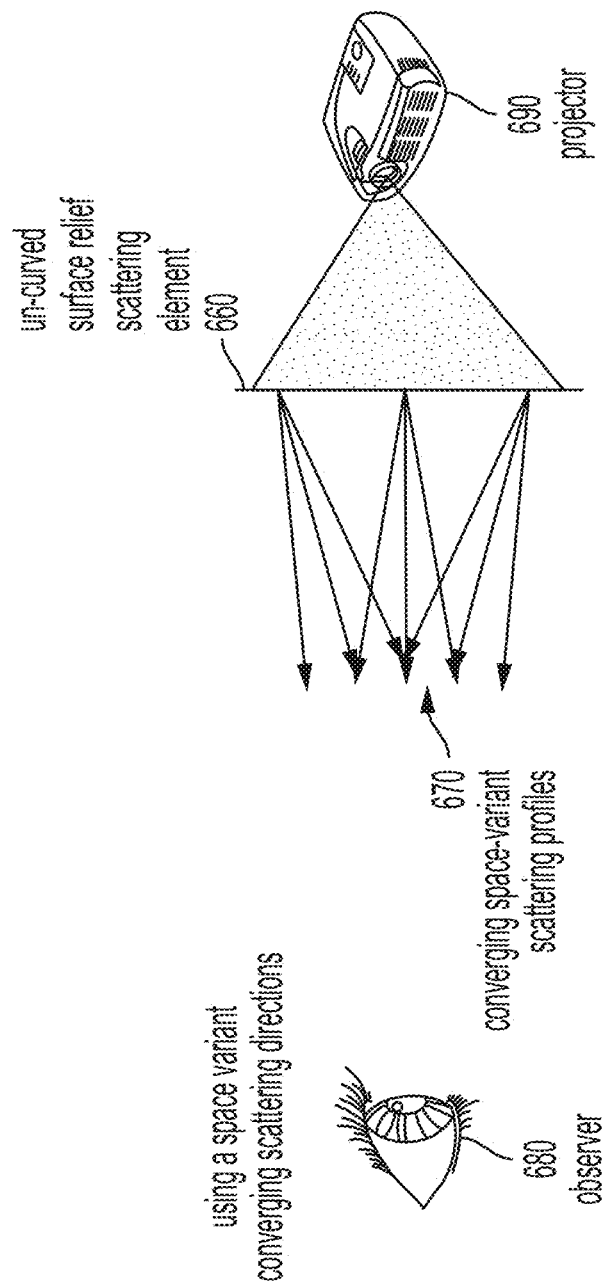
FIG. 6B shows an illustration of a system for playback using a space variant scattering surface relief pattern with converging scattering directions in accordance with some embodiments of the present disclosure.

FIGS. 6A and 6B show a method of recording and using a space-variant scattering profile with converging scattering directions. In FIG. 6A, a recording setup is shown that consists of a laser 610, an objective lens 620, a master diffuser 630, creating an incident speckle field 640 onto a photosensitive medium 650. Briefly, the coherent laser light transmitted through the master diffuser 630 creates a field of laser speckle that is recorded on the photosensitive medium 650. The size and arrangement of the speckle recorded on the photosensitive medium will determine the scattering profile of the resultant surface relief scattering element. The size and arrangement of the speckle 640 are influenced by the power of the objective lens 620, the distance from objective lens 620 to master diffuser 630, the properties of the master diffuser 630, as well as the distance to the photosensitive medium 650 and the angle of incidence of the projected speckle pattern 640 onto the photosensitive medium 650. The master diffuser can be any type of diffuser including ground glass, lenticular, or holographic. Although the photosensitive medium 650 is recording a speckle pattern consisting of intensity variations, it turns out that, for many photosensitive media, including Dichromated gelatin (DCG) or photoresist as well as other photosensitive media, the developed photosensitive medium also exhibits a surface relief profile where the profile height is related to the intensity of the speckle pattern 640 at each location. The photosensitive medium 650 is curved so that different parts of the medium are at different angles to the incident speckle beam from the laser setup. This results in recording different off-axis angles for the resulting scattering profiles at different positions across the photosensitive medium. When the resulting surface relief profile is used to create a scattering element on an un-curved substrate, it results in a space-variant scattering element with converging off-axis scattering directions as shown in FIG. 6B. FIG. 6B shows that using the space-variant scattering profile resulting from the recording setup of FIG. 6A, light projected from the projector 690 onto the un-curved surface relief scattering element 660, produces converging space-variant scattering profiles 670 that concentrate the light towards the eye of the observer 680. In this way, it can be appreciated that the space-variant converging nature of the un-curved scatter element 660, improves the efficiency and brightness of the projected information for the observer.

While the foregoing description has described how a space-variant scattering element with converging scattering directions has been described, it should be appreciated that other space-variant scattering profiles such as diverging scattering elements and scattering elements with two-dimensional converging or diverging scattered beams could be recorded in the same manner by using different curvatures for the photosensitive medium.

Returning now to the process of constructing a transparent screen, as shown in FIG. 4, with the random surface relief element in hand, the next step is to apply a partially reflective thin-film coating to the scattering surface 420. Exemplary methods of applying thin-film coatings to optical surfaces are suitable for use in connection with applying a partially reflective thin-film coating to the scattering surface 240 include vacuum deposition, evaporation, and sputtering. The specifications for the coating will vary depending on application. The essential aspects are that the coating must provide reflection at the optical wavelengths that will be projected onto the transparent screen, and the coating must provide transmission of the optical wavelengths that are to be observed through the transparent screen. Typically, these wavelengths ranges are the visible wavelengths from approximately 430 nm to approximately 750 nm.

Once the partially reflective coating has been applied, the next step 460 is to bond the transparent substrate with the same index of refraction as the substrate of the surface relief scattering element 430 and the polarizer 440 (optional) over the substrate with coated surface relief scattering profile using an optical adhesive with the same index of refraction (after curing) as the two transparent substrates 450. The optional polarizer 440 can be bonded directly adjacent to the coated surface followed by the second transparent substrate 430 at the outside of the assembly, or the second transparent substrate 430 could be bonded adjacent to the coated surface followed by the polarizer bonded at the outside face of the assembly.

Figure 7:
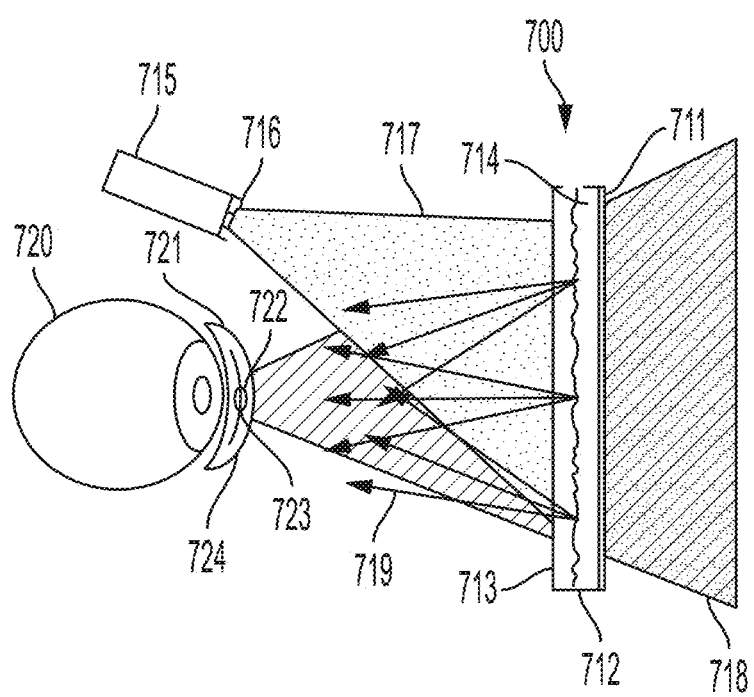
FIG. 7 shows an illustration of a transparent screen in use with augmented reality glasses in accordance with some embodiments of the present disclosure.

FIG. 7 shows an illustration of a transparent screen 700 used in an augmented reality smart glasses application. Just one eye of the augmented reality system is shown, although in actual use a second system with an identical layout for a second eye may also be used. The transparent screen 700 functions as the lens of the glasses allowing the user to see the information 717 projected onto the transparent screen as well as the world scene 718 in front of the user. The transparent screen 700 may or may not have optical power depending on the eyeglasses prescription of the user. The transparent screen 700 consists of a first substrate 713 with a surface relief scattering pattern that is coated with a partially reflecting coating 712 and bonded to a second transparent substrate 714 and polarizer 711 using an optical adhesive with index of refraction matched to the first substrate 713. The figure shows the scattering profile 719 of an embodiment, which is a space-variant scattering profile with converging scattering directions. Other scattering profiles, including space-invariant scattering profiles could also be used in other embodiments. The advantage of the space-variant scattering profile with converging scattering directions is that the projected display light 717 reflected from the transparent screen 700, is aimed at the user's eye from all locations on the transparent screen 700 resulting in improved efficiency of the display system by not wasting light by reflecting it in directions that the user's eye cannot access.

Figure 8:
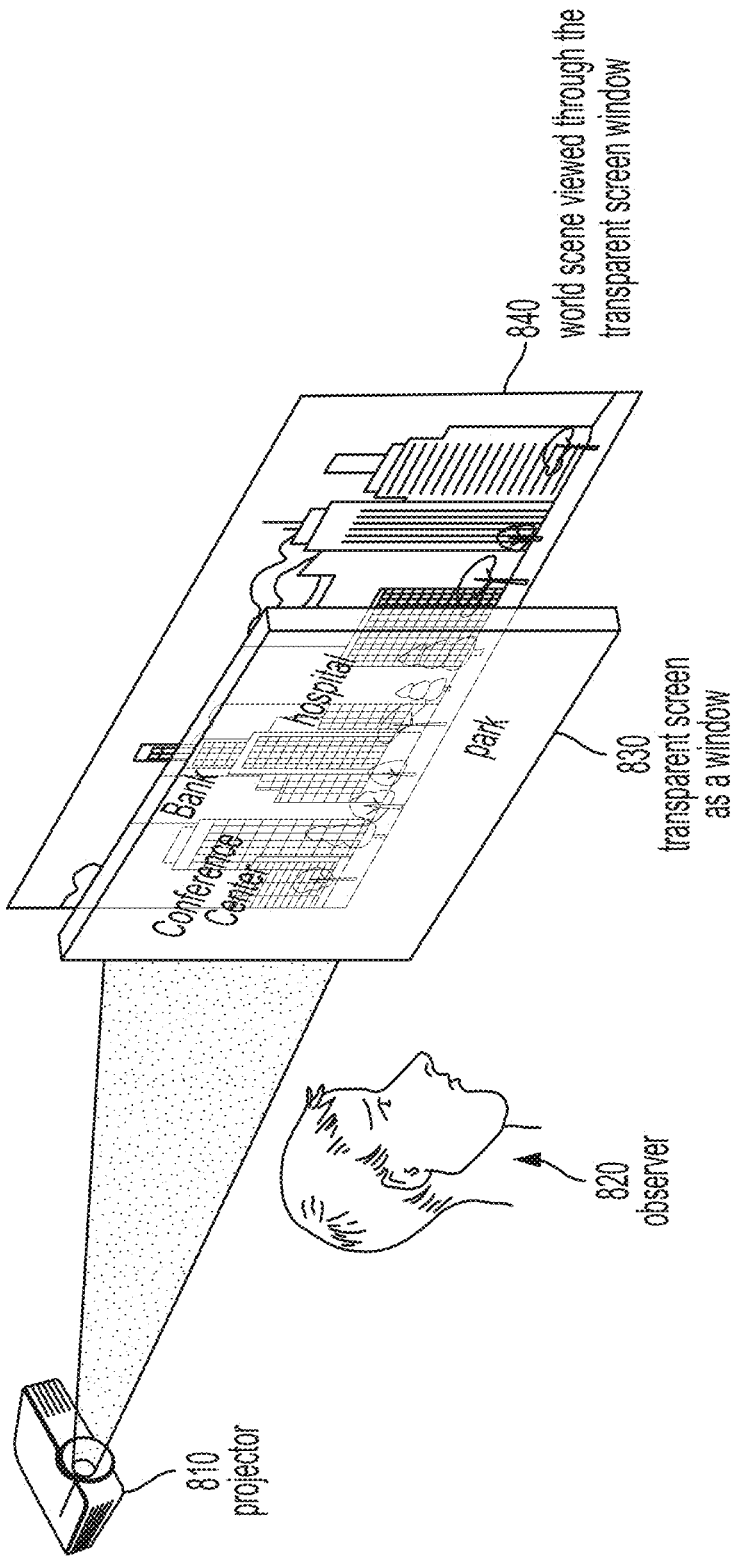
FIG. 8 shows an illustration of a transparent screen functioning as a window to overlay information onto a scene viewed through the window in accordance with some embodiments of the present disclosure.

An augmented reality system as shown in FIG. 8 includes a specially designed contact lens 721 (shown in FIG. 7) worn by the user to enable focusing his eye onto the scattering surface of the transparent screen 700 which is located where an eyeglasses lens is typically located, about 13-25 mm in front of the eye, too near for the eye to focus without the special contact lens 721. Contact lens 721 contains a lenslet 722 in the center of the contact, said lenslet having an optical power that allows the user to focus on the information projected onto transparent screen 700. The lenslet 722 further has a diameter that is small compared to the diameter of the user's eye pupil so that, using the light that passes through the eye pupil in the region surrounding the lenslet 722, the user is able to view and focus the information 718 from the world view in front of the user. Polarization filters 723 and 724 are also included in contact lens 721 to aid in the simultaneous viewing of the projected display light reflected from the transparent screen 719 and light from the world scene in front of the user 718. Projector 715 may naturally project polarized light or optional polarization filter 716 may be added in front of projector 715 to polarize the projected light. Polarization filter 723 in contact lens 721 sits behind lenslet 722 such that any light passing through lenslet 722 must also pass through polarization filter 723 before entering the eye. Polarization filter 723 is configured to pass the same polarization as the light from the projector 817. Polarizer 711 is configured be orthogonal to and to block to the polarization of light from the projector 717. As light from the world scene in front of the user 718 must pass through polarizer 711 on its way to the eye, light from the world scene incident on contact lens 721 is polarized orthogonal to the 717 display light from the projector. Thus, light from the world scene is prevented from entering the eye through lenslet 722 by polarization filter 723.

Polarization filter 724 is built into contact lens 721 in the region surrounding lenslet 722 and polarization filter 723. It is configured to pass the orthogonal polarization to the light passed by polarization filter 723. In this way polarization filter 724 passes light from the world scene in front of the viewer 718 while blocking light 717 from the projector. To summarize, the polarization filters 723 and 724 in contact lens 721 are configured such that the user views the display light 719 only through the central lenslet 722 and views the light from the world scene 718 only through the region of the eye pupil outside of the central lenslet.

FIG. 8 shows an illustration of a transparent screen 830 (formed as the screen 200 shown in FIG. 2A and FIG. 2B) functioning as a window to overlay information onto a scene viewed through the window. The transparent screen 830 can be used anywhere a window would be used to enable augmenting the view through the window with information projected onto the window. This includes using the transparent screen 830 in place of or as part of a windshield in a car, train, boat, or plane. It might also be used in place of a window in front of a museum or store display or a window in a home or building. FIG. 8 shows transparent screen 830 as a window overlooking a city scene 840 onto which information labeling the buildings in the scene has been projected by projector 810. Observer 820 sees both the city scene 840 and the projected labels. Thus, the disclosure provides a design and method for constructing a transparent screen. The transparent screen includes a reflecting scattering surface onto which information can be projected and viewed, while also maintaining scatter-free transmission of light allowing one to look through the screen as one would look through a window.

A surface relief pattern on one surface of the transparent substrate indicates that the surface is not smooth and not parallel to the opposite surface of the transparent substrate, but rather has surface height variations that act to change the direction of light rays passing through the transparent substrate. In this disclosure, the surface relief pattern functions to scatter the light rays, that is, a bundle of light rays incident on the transparent substrate with some bounding cone of ray angles will exit the transparent substrate after passing through the surface relief pattern with an expanded bounding cone of ray angles. At least some of the light will exit the transparent substrate with larger ray angles than before passing through the transparent substrate.

Random sub-pixel variations are a property of the surface relief pattern. "Random" indicates that the surface relief pattern of surface height variations is not predictable. It is neither repetitive nor can it be specified by a mathematical function. Its spatial frequency spectrum contains a continuous span of frequencies ranging from low frequencies up to frequencies corresponding to variations that are smaller than the smallest pixel for which the screen will be used ("sub-pixel variations"). Typically, this means sub-micron variations that impose no constraint on minimum pixel size.

Most scattering optical elements scatter light symmetrically around the direction of the incident ray bundle (the "axis"). That is, if light is scattered to the direction of +N degrees by a given amount, it is also scattered to the direction of −N degrees by the same amount. An "off-axis scattering profile" means that the light is not scattered symmetrically around the incoming ray directions. Rather, the light is asymmetrically scattered preferentially to one side of the ray bundle axis.

A circular scattering profile is a symmetric scattering profile where light is scattered equally in all directions. An incoming beam (like a laser beam) creates a uniform circle of light that gets bigger the further the light travels after passing through the scatterer.

An elliptical scattering profile is a symmetric scattering profile relative to the incident ray bundle axis, but rather than scattering light equally in all directions, light along one direction is scattered by a larger angular amount than light along an orthogonal direction. An incoming beam (like a laser beam) creates an elliptical pattern of light that gets bigger the further the light travels after passing through the scatterer.

A space variant scatterer is one where light is scattered differently by different parts of the scatterer. For example, one location on the scattering element may scatter light to the left in an off-axis scattering profile while another location scatters light to the right in an off-axis scattering profile. A "space-variant scatterer with converging scattering directions" scatters light in a different off-axis scattering profile for each location on the scatterer AND the off-axis scattering profiles vary as a function of position in such a way that the off-axis scattering direction from one position is of the opposite sign and approximately the same amount as from its symmetric position relative to the center of the scattering element. In this way, if the entire scattering element is illuminated by a collimated beam of light, the scattered light will have a footprint that gets smaller the further the light travels after passing through the scatterer until it reaches a distance from the scatterer where the scattered light footprint has converged to a minimum size, and after which the footprint will start to grow bigger with more distance from the scattering element.

In summary, the disclosure provides a design and method of construction for a transparent screen that completely avoids scattering of the transmitted light, and acts as a projection screen in reflection with no restriction on the incident angle of the projected light. Furthermore, the transparent screen is not based upon an array of fundamental pixel-sized scattering elements, but rather on a continuous and smoothly varying surface relief pattern with random subpixel variations. As a consequence, there is no resolution limitation or minimum pixel size imposed upon the projected information. The screen design offers a straightforward approach to creating many different screen scattering profiles including circular, non-circular, symmetric, asymmetric, on-axis, off-axis, uniform, non-uniform (space variant), as well as converging. Furthermore, this disclosure provides a path to creating fully space-variant scattering profiles with a simple method that avoids the need for expensive and lengthy point-by-point lithography processes.

Reference throughout this specification to "an embodiment," "some embodiments," or "one embodiment," means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A transparent screen comprising:
a first transparent substrate having a first transparent substrate index of refraction and including a continuous and smoothly varying surface relief pattern;
a partially reflective coating formed on the continuous and smoothly varying surface relief pattern; and
a second transparent substrate bonded over the partially reflective coating with an optical adhesive having the first transparent substrate index of refraction, wherein the continuous and smoothly varying surface relief pattern further includes one or more random sub-pixel variations.

2. A transparent screen comprising:
a first transparent substrate having a first transparent substrate index of refraction and including a surface relief pattern;
a partially reflective coating formed on the surface relief pattern; and
a second transparent substrate bonded over the partially reflective coating with an optical adhesive having the first transparent substrate index of refraction, wherein the surface relief pattern further includes one or more random sub-pixel variations, wherein the random sub-pixel variations are sub-micron variations.

* * * * *